United States Patent
Kumar et al.

(10) Patent No.: US 7,742,619 B2
(45) Date of Patent: Jun. 22, 2010

(54) IMAGE WATERMARKING BASED ON SEQUENCY AND WAVELET TRANSFORMS

(75) Inventors: Sanjeev Kumar, Bangalore (IN); Raghuram Karthik Jayaraman, Goleta, CA (US)

(73) Assignee: Texas Instruments Incorporated, Dallas, TX (US)

( * ) Notice: Subject to any disclaimer, the term of this patent is extended or adjusted under 35 U.S.C. 154(b) by 853 days.

(21) Appl. No.: 11/613,261

(22) Filed: Dec. 20, 2006

(65) Prior Publication Data

US 2007/0140524 A1   Jun. 21, 2007

Related U.S. Application Data

(60) Provisional application No. 60/752,583, filed on Dec. 21, 2005.

(51) Int. Cl.
  *G06K 9/00* (2006.01)
  *H04L 9/32* (2006.01)
  *H04L 1/40* (2006.01)
(52) U.S. Cl. .................. 382/100; 713/176; 358/3.28
(58) Field of Classification Search .................. None
  See application file for complete search history.

(56) References Cited

U.S. PATENT DOCUMENTS

2004/0215965 A1 * 10/2004 Tokuda et al. .............. 713/176
2007/0092102 A1 *  4/2007 Kot et al. .................... 382/100

\* cited by examiner

*Primary Examiner*—Charles Kim
(74) *Attorney, Agent, or Firm*—Robert D. Marshall, Jr.; W. James Brady; Frederick J. Telecky, Jr.

(57) ABSTRACT

This invention is a new approach for the image watermarking in the wavelet transform domain based on sequency of the host and watermark image. For each sub-band a first transform level of the host image is thresholded and binarized. Sequencies of thresholded and binarized data host image are compared with sequencies of the discrete wavelet transformed watermark image to form a watermarking sequency mask. The watermarked wavelet domain data is formed by combining data elements of the discrete wavelet transformed host image with corresponding data elements of the wavelet transformed watermark image as filtered by the watermarking mask. A reverse process can extract the watermark with a high degree of accuracy even after attack upon the watermarked host image.

16 Claims, 8 Drawing Sheets

*FIG. 9*
   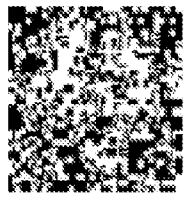
*FIG. 10A*  *FIG. 10B*  *FIG. 10C*  *FIG. 10D*
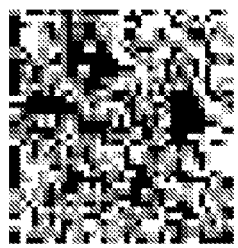
*FIG. 11*

IMAGE WATERMARKING BASED ON SEQUENCY AND WAVELET TRANSFORMS

CLAIM OF PRIORITY

This application claims priority under 35 U.S.C. 119(e)(1) to U.S. Provisional Application No. 60/752,583 filed Dec. 21, 2005.

TECHNICAL FIELD OF THE INVENTION

The technical field of this invention is image watermarking.

BACKGROUND OF THE INVENTION

Watermarking of the multimedia contents is of prime importance for claiming and establishing ownership. An image watermark is data added to the image data. This added data is included in such a way that the image quality is not degraded. Later extraction tools may be applied to the image data to recover the watermark. The recovered watermark is evidence of the original ownership claim to the image.

Most of watermarking techniques are vulnerable to the attacks or are poorly extracted after the attacks. Images are very common in multimedia contents and need a robust watermarking scheme that can withstand the attacks and at the same time have a recognizable extracted watermark.

In recent years, image watermarking has been a very active area of research and industry. Various techniques have been used for image watermarking in the spatial domain, the transform domain and the spread spectrum domain.

SUMMARY OF THE INVENTION

This invention is a new sequency and wavelet transform based watermarking technique. The inventive technique is more robust in response to attacks like JPEG, Median filtering and blurring. The inventive technique provides for good extraction of the watermark image. The inventive technique performs very well in terms of subjective (perceptual) and objective (in terms of PSNR) image quality measures.

BRIEF DESCRIPTION OF THE DRAWINGS

These and other aspects of this invention are illustrated in the drawings, in which:

FIG. 9 illustrates the corresponding watermarked image in accordance with the examples of FIGS. 7A and 7B;

FIGS. 10A to 10D illustrate a comparison of the original watermark image with watermark images extracted from watermarked host images subject to JPEG attack of varying quality factors;

FIG. 11 illustrates an example extracted watermark resulting from a median filtering attack of a watermarked host image;

DETAILED DESCRIPTION OF PREFERRED EMBODIMENTS

This invention is a new image watermarking technique based on the sequency of the host and watermark images in the wavelet transform domain. Sub-bands of the host image are thresholded and converted to binary format. The row sequency of the sub-bands of these binary sub-bands of the host image represents the threshold crossing (zero crossings) of the image pixels in the wavelet transform domain. Similarly in the binary discrete wavelet transform (BDWT) domain where the watermark image is being de-correlated, the row sequency of each sub-band represents the zero crossing of the watermark image pixels.

This invention uses these sequencies of host and watermark images to devise a new watermarking technique. In the transform domain, the sequency of each row of respective sub-bands is used to determine a sequency dependent mask. This mask facilitates better embedding of the watermark in the appropriate sequency components in the respective sub-bands.

This invention is the first use of the sequencies of host and watermark images to devise a new robust image watermarking scheme. This invention is also the first to embed the watermark in the LL band (low frequency sub-band after discrete wavelet transform in 2-dimensions) of the host image and maintain the perceptual signal to noise ration (PSNR) and the perceptual quality of the watermarked host image.

This invention uses an Adaptive Parabolic Gain adjustment technique that enables effective embedding into the sub-bands of the host image.

This invention includes a watermark extraction algorithm. This watermark extraction algorithm takes into account the impact of attacks on the statistics of the watermarked image such as autocorrelation change of the host due to attack and embedding of the watermark. Experiments on the new sequency based watermarking algorithm show its robustness to attacks and better normalized correlation (NC). Normalized Correlation is an objective measure and defined as:

$$NC = \frac{\sum_i \sum_j (W(i,j) W'(i,j))}{\sum_i \sum_j (W(i,j))^2} \quad (1)$$

Where: $W(i,j)$ is original watermark image; and $W'(i,j)$ is the extracted watermark image.

The performance results of this invention are clearly superior to exemplary prior art algorithms. This invention is more robust to JPEG attacks in its class of algorithms and maintains the perceptual quality of the watermarked host image.

Figure 1:
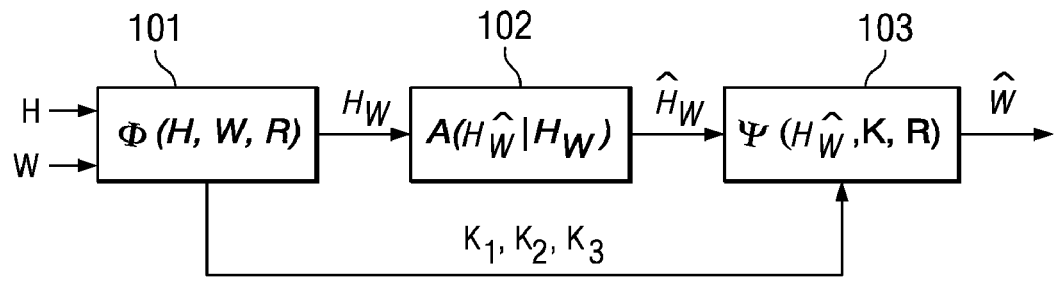
FIG. 1 illustrates the process of watermarking an image and extracting the watermark from an image subject to attack.

FIG. 1 illustrates the general watermarking problem. Watermark function 101 receives a host image H and a watermark W. Watermark function 101 embeds the watermark W into the host image H according to the function Φ(H,W,R). R is the autocorrelation of the sub-band pixels of the host image. Watermark function 101 generates a watermarked image $H_W$ and a set of side information keys K. Keys K are used in later extraction of the watermark. Attack function 102 models the possible attacks on the watermark image $H_W$ according to the function $A(H_{\tilde{W}}|H_W)$. This attack results in an image $\tilde{H}$. Watermark extraction function 103 extracts the watermark image from the attacked image $\tilde{H}$ via function $\Psi(H_{\tilde{W}},K,R)$. Watermark extraction function 103 uses keys K which are available only to the owner of the original image and not to the attacker. The result is extracted watermark $\tilde{W}$.

In this description: host image H is a matrix of size N by N where each element belongs to the set of integers Z of size N; watermark image W is a matrix of size N/4 by N/4 where each element belongs to the set of integers Z of size 2 containing elements 0 and 1; R is a correlation matrix of host image pixels of size N by N where each element belongs to the set of integers Z of size N; key vector K includes keys $K_1$, $K_2$ and $K_3$; $K_1$ is a subset of $Z_{N/8}$; $K_2$ is a subset of Z; and $K_3$ is a subset of $R_4$, which is a set of real numbers or cardinality four.

This application uses the following notation for wavelet transform segments. $X\_YZ_n$: where X denotes H for the host image or W for the watermark image; YZ denotes one of the sub-bands selected from LL, HL, LH or HH; and the subscript n denotes the sub-band number. Thus $H\_LH_3$ denotes the level 3 LH sub-band of the host image. These notations will be more fully described in FIGS. 3 to 5. The subscript w indicates the watermark image and the subscript h indicates the host image. Thus $H_W$ is watermarked host image and $\hat{H}_w$ is watermarked host image after the attack.

Figure 2:
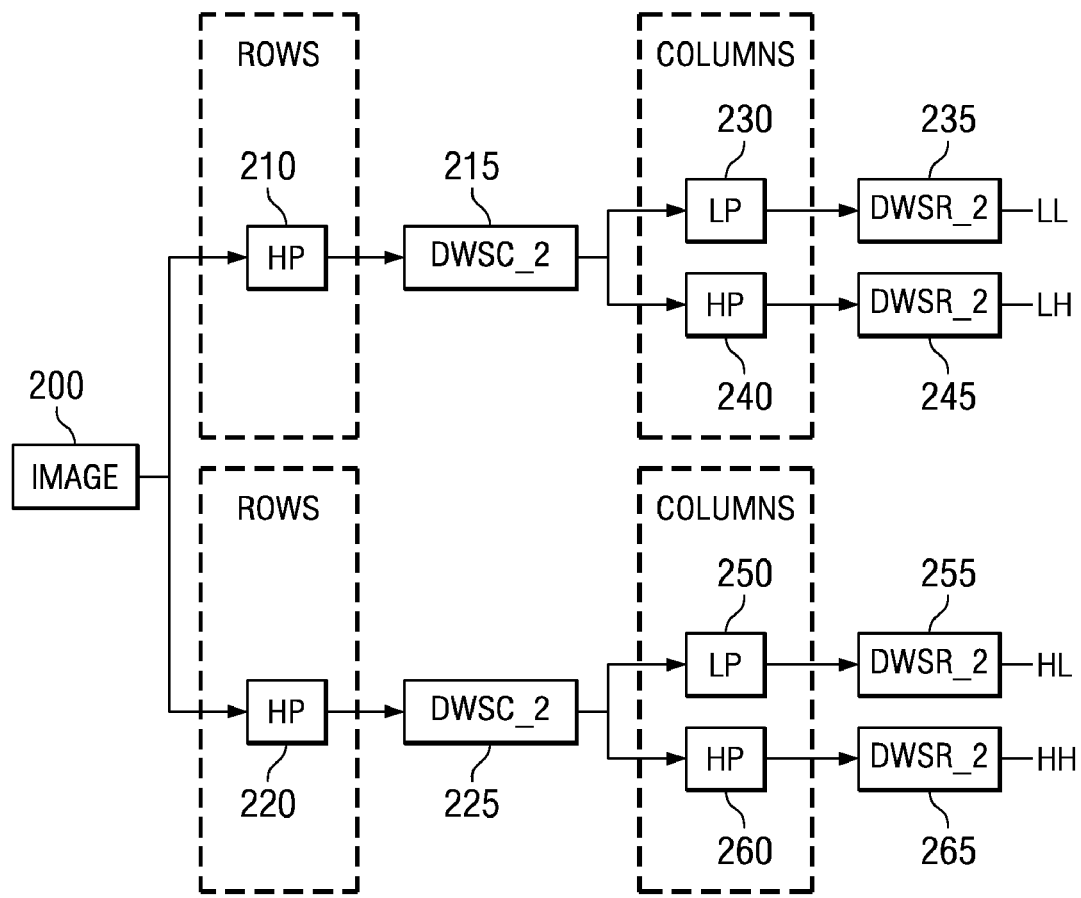
FIG. 2 illustrates in schematic form one level of wavelet decomposition (Prior Art)

Wavelet encoding of image data transforms the image from a pixel spatial domain into a mixed frequency and spatial domain. In the case of image data the wavelet transformation includes two dimensional coefficients of frequency and scale. FIG. 2 illustrates the basic technique of wavelet image transformation. Wavelet coefficients of the image are computed using one dimensional wavelet filters using a Daubechies filter for the host image and a binary wavelet filter for the binary watermark image. This decomposition provides sub-images corresponding to different resolution levels and orientations. The reconstruction process is the complementary process of this decomposition process and done by reversing the steps of the decomposition process. The two dimensional array of pixels is analyzed X and Y directions and a set for transformed data that can be plotted in respective X and Y frequency.

FIG. 2 illustrates one stage of wavelet decomposition. The input is image matrix 200. Note that this input could be the original image for a first stage decomposition or the result of a prior stage of wavelet decomposition. The rows of this image matrix are low pass filtered in low pass filter 210 and high pass filtered in high pass filter 220. The low pass result from low pass filter 210 is subjected to a column down sample by a factor of 2 in column down sampler 215. Similarly, the low pass result from low pass filter 220 is subjected to a column down sample by a factor of 2 in column down sampler 225. Each of these down sampled outputs is similarly processed. Low pass filter 230 low pass filters the output of column down sampler 215. The low pass result from low pass filter 230 is subjected to a row down sample by a factor of 2 in row down sampler 235. The row down sampled result of row down sampler 235 is the LL output sub-band. Low pass filter 240 low pass filters the output of column down sampler 215. The low pass result from low pass filter 240 is subjected to a row down sample by a factor of 2 in row down sampler 245. The row down sampled result row down sampler 245 is the LH output sub-band. Low pass filter 250 low pass filters the output of column down sampler 225. The low pass result from low pass filter 250 is subjected to a row down sample by a factor of 2 in row down sampler 255. The row down sampled result row down sampler 255 is the HL output sub-band. Low pass filter 260 low pass filters the output of column down sampler 225. The low pass result from low pass filter 260 is subjected to a row down sample by a factor of 2 in row down sampler 265. The row down sampled result row down sampler 265 is the HH output sub-band. Low pass filters 210, 230 and 250 and high pass filters 220, 240 and 260 are the one dimensional wavelet filters noted above.

Figure 3:
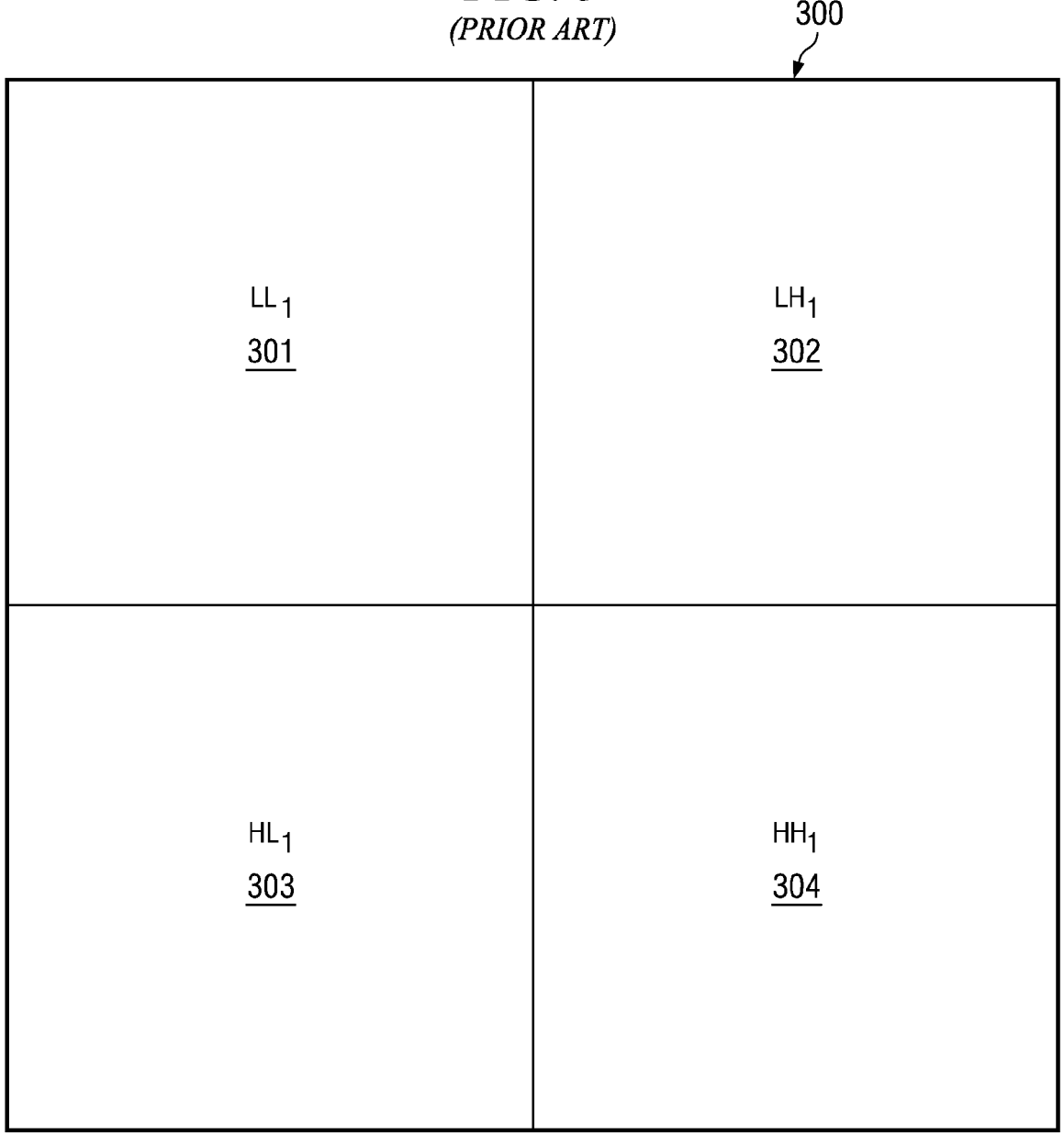
FIG. 3 illustrates transformed wavelet data divided into four quadrant sub-bands (Prior Art)
Figure 4:
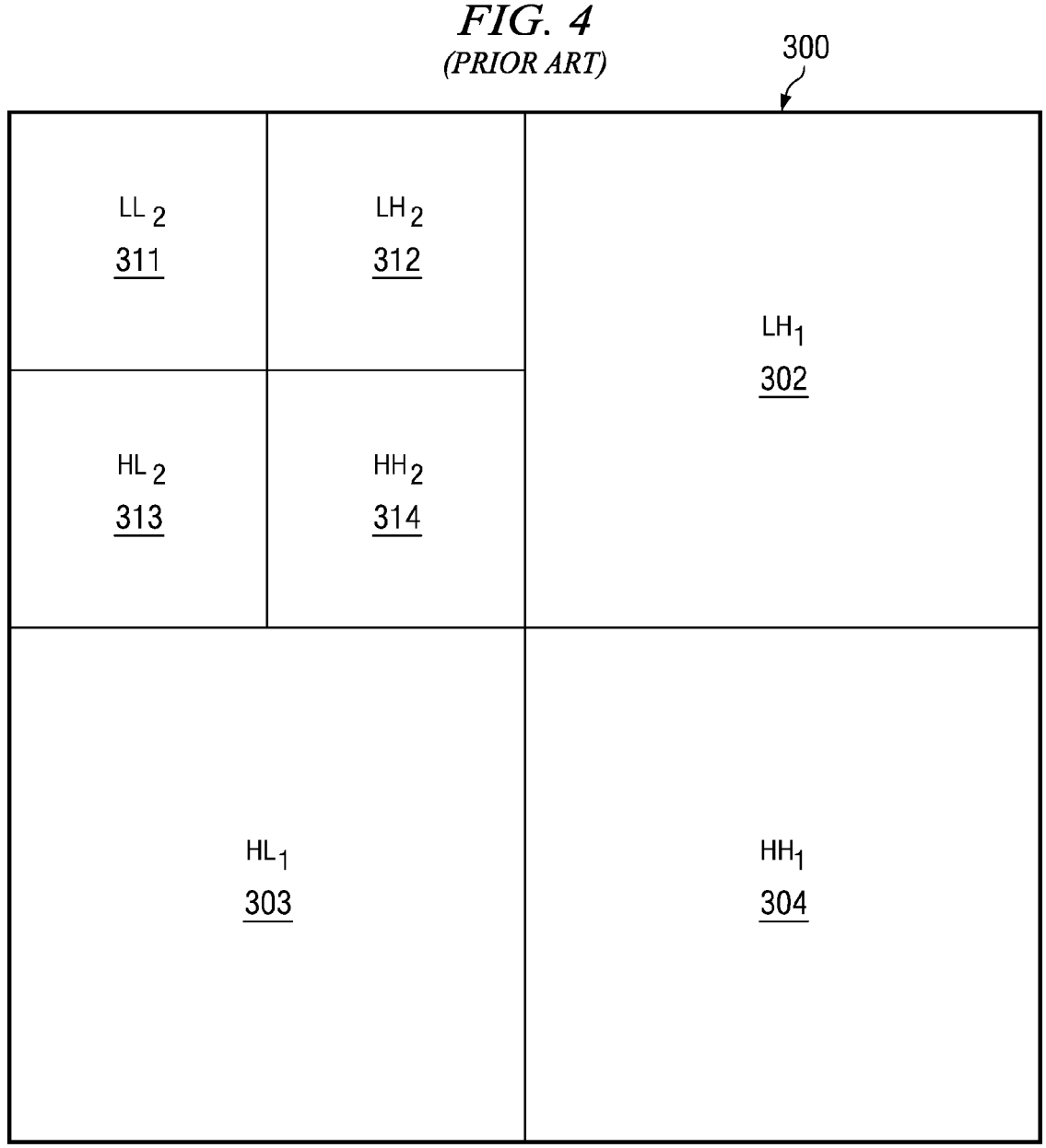
FIG. 4 illustrates further division of a quadrant into smaller bands (Prior Art)
Figure 5:
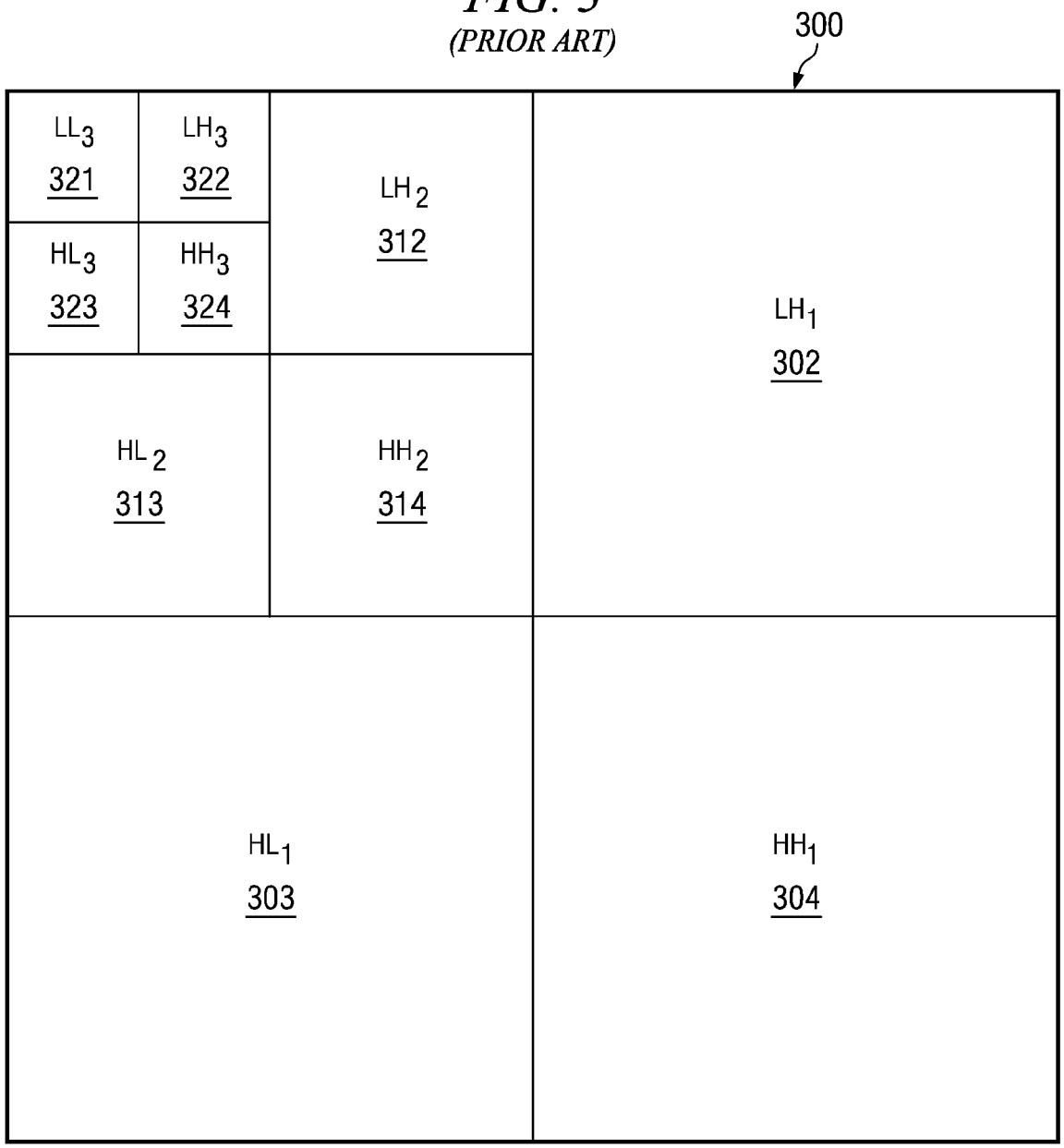
FIG. 5 illustrates a third level division of a subquadrant into yet smaller bands (Prior Art)

Each of FIGS. 3 to 5 represents one stage in a multi-scale sub-band decomposition of an image. FIG. 3 illustrates transformed data 300 with the upper left corner the origin of the X and Y frequency coordinates. This transformed data is divided into four quadrant sub-bands. Quadrant 301 includes low frequency X data and low frequency Y data denoted as $LL_1$. Quadrant 302 includes low frequency X data and high frequency Y data denoted $LH_1$. Quadrant 303 includes high frequency X data and low frequency Y data denoted $HL_1$. Quadrant 304 includes high frequency X data and high frequency Y data denoted $HH_1$.

Organizing the image data in this fashion with a wavelet transform permits exploitation of the image characteristics for data analysis and manipulation. It is found that most of the energy of the data is located in the low frequency bands. The image energy spectrum generally decays with increasing frequency. The high frequency data contributes primarily to image sharpness. When describing the contribution of the low frequency components the frequency specification is most important. The energy distribution of the image data may be further exploited by dividing quadrant 301 $LL_1$ into smaller bands. FIG. 4 illustrates this division. Quadrant 301 is divided into subquadrant 311 denoted $LL_2$, subquadrant 312 denoted $LH_2$, subquadrant 313 denoted $HL_2$ and subquadrant 314 denoted $HH_2$. As before, most of the energy of quadrant 301 is found in subquadrant 311. FIG. 5 illustrates a third level division of subquadrant 311 into subquadrant 321 denoted $LL_3$, subquadrant 322 denoted $LH_3$, subquadrant 323 denoted $HL_3$ and subquadrant 324 denoted $HH_3$.

For an n-level decomposition of the image, the lower levels of decomposition correspond to higher frequency sub-bands. Level one represents the finest level of resolution. The n-th level decomposition represents the coarsest resolution. Moving from higher levels of decomposition to lower levels corresponding to moving from lower resolution to higher resolution, the energy content generally decreases. If the energy content of level of decomposition is low, then the energy content of lower levels of decomposition for corresponding spatial areas will generally be smaller. There are spatial similarities across sub-bands.

This invention uses the sequencies of host and watermark images to devise a new watermarking scheme. In the wavelet transform domain, the sequency of each row of respective sub-bands is used to decide a sequency dependent mask. This mask facilitates better embedding of the watermark in the appropriate sequency components in the respective sub-bands.

In this invention the sub-band $LL_1$ of the watermark is embedded in the $LL_1$ band of the host image. The perceptual signal to noise ratio (PSNR) of the host watermarked image is still within acceptable limits. Experimental results of the new sequency watermarking algorithm show robustness to attacks and better NC.

This invention uses the sequencies of the binary image for the first time. Since the sequency is defined as the number of zero crossing of the binary data and represents the zero crossings of the binary sequence, it is a very effective way of exploring and embedding the watermark in the respective sequency indexed sub-bands of the host image in the wavelet transformed domain.

Figure 6:
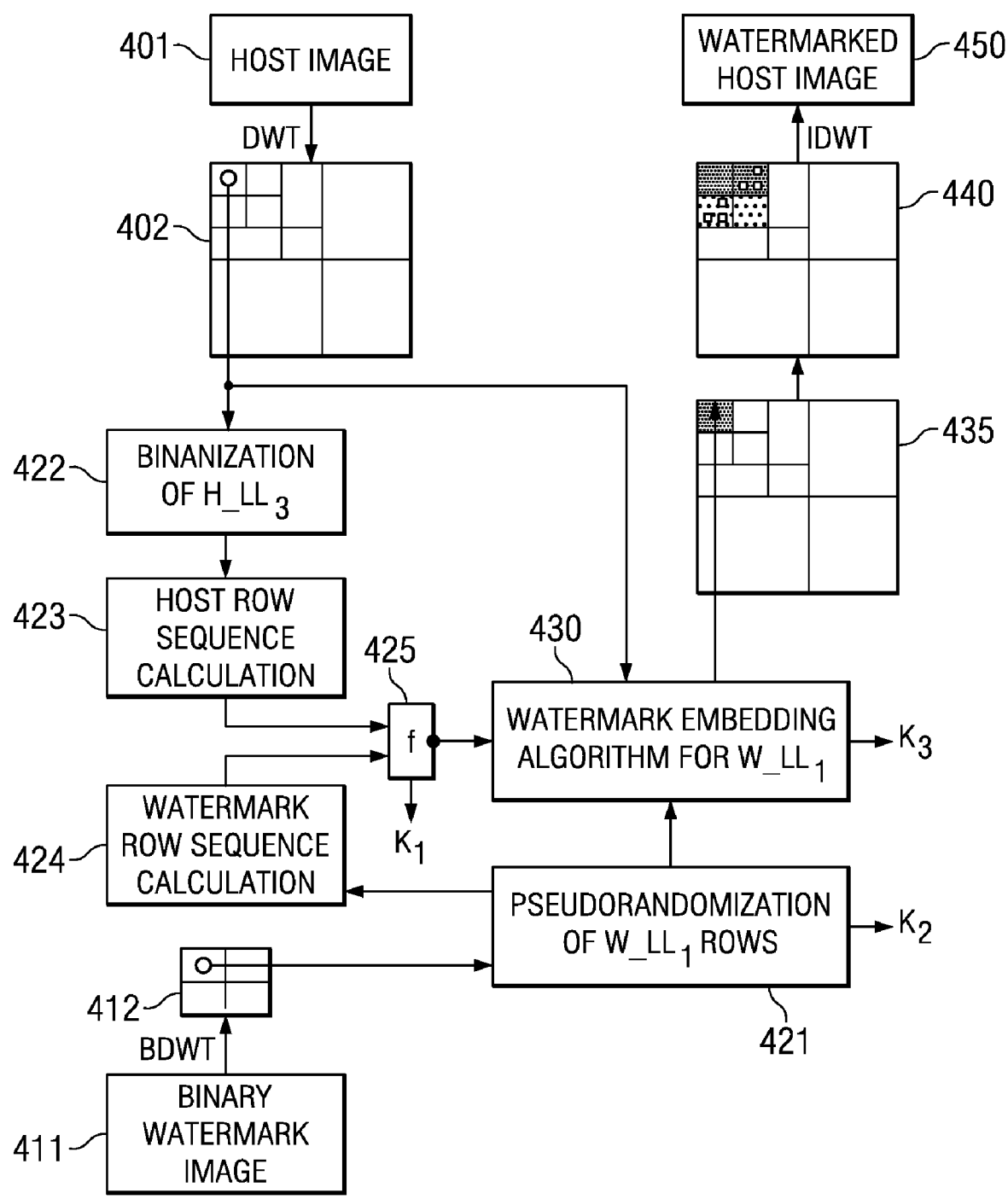
FIG. 6 schematically illustrates the embedding of a watermark in the wavelet and sequency transformed domain of a host image.

FIG. 6 schematically illustrates an example 400 of the watermarking of this invention. Host image 401 is wavelet transformed using discrete wavelet transform (DWT) into wavelet transformed host image 402. This example uses a Daubechies discrete wavelet transform into three level wavelet sub-bands $LL_3$, $LH_3$, $HL_3$, $HH_3$, $LH_2$, $HL_2$, $HH_1$, $LH_1$, $HL_1$ and $HH_1$ such as illustrated in FIG. 5. A binary watermark image 411 is transformed using binary discrete wavelet transform (BDWT) into wavelet transformed watermark image 412. In this example the binary watermark image is transformed into one level sub-bands $LL_1$, $LH_1$, $HL_1$ and $HH_1$ such as illustrated in FIG. 3. In this example host image 401 has dimensions N by N pixels and binary watermark image has dimension N/4 by N/4 pixels.

FIG. 6 illustrates details of process 400 of embedding the W_$LL_1$ sub-band into the H_$LL_3$ sub-band. The embedding of other sub-bands of the watermark image into respective host image sub-bands is similar. In particular the W_$LH_1$, W_$HL_1$ W_$HH_1$ sub-bands are embedded into respective H_$LH_3$, H_$HL_3$ and H_$HH_3$.

Process 400 next pseudo randomizes (prand) the rows of W_$LL_1$ (421) as shown in equation (2).

$$P_{rand}: W\_LL_1 \rightarrow \tilde{W}\_LL_1 \qquad (2)$$

The seed used in this pseudo randomization generates the key K2.

The next step in process 400 is binarization of sub-band H_$LL_3$ (422). This involves thresholding the gray scale image. Next process 400 calculates the row sequencies $S_h$ (423) which are the number of crossings over a threshold (zero crossing) of H_$LL_3$ according to equation (3):

$$S_h = \left\{ S_h(i) \in Z_i; i = 1, \ldots \frac{N}{8} \right\} \qquad (3)$$

Similarly process 400 calculates the row sequencies $S_w$ (424) of the binary W_$LL_1$ according to equation (4):

$$S_w = \left\{ S_w(i) \in Z_i; i = 1, \ldots \frac{N}{8} \right\} \qquad (4)$$

These sequencies $S_h$ and $S_w$ are not unique so first best match is selected. The selected sequency of the watermark image row is excluded in subsequent iterations.

Embedding mask generation 425 sets an embedding mask function $f$ for sub-band H_$LL_3$ given by:

$$f_{LL_3} = \{f(1) = (j: \min|S_h(i) - S_w(j)|)\} \qquad (5)$$

$$\forall\, i \text{ and } j = 1, \ldots, \frac{N}{8} \text{ where } i, j \in \left\{1, \ldots, \frac{N}{8}\right\}$$

where: |X| is the Euclidian norm distance measure. The embedding masking function $f_{LL_3}$ generates key $K_1$ for the sub-band $LL_3$. Embedding mask generator 425 performs the transform:

$$f_{LL_3}: \tilde{W}\_LL_1(i,j) \rightarrow \tilde{W}\_LL_1(f_{LL_3}(i),j) \qquad (6)$$

Watermark embedding algorithm 430 operates for W_$LL_1$ as function $\Psi(H,W,R)$ noted in conjunction with FIG. 1 as follows:

$$\hat{H}\_LL_3(i,j) = H\_LL_3(i,j) + \alpha_{LL_3} * S(H\_R_{LL_3}(i,j)) * \tilde{W}\_LL_3(f_{LL_3}(i),j) \qquad (7)$$

where: $\alpha_{LL_3}$ is a constant watermark strength given by:

$$\alpha = [\alpha_{LL_3}, \alpha_{LH_3}, \alpha_{HL_3}, \alpha_{HH_3}]^T \qquad (8)$$
$$= [2, 1, 1, 1]^T;$$

with $[x]^T$ the transpose of a column vector x;

$$S(H\_R_{LL_3}(i,j)) = (2 * \sqrt{K_{3(LL_3)} * \mathrm{abs}(H\_R_{LL_3}(i,j))} + G_{LL_3}(i,j), \qquad (9)$$

which is a parabolic function of H_$R_{LL_3}(i,j)$; abs(x) is the absolute value of x;

$$G_{LL_3}(i,j) = \{2 * \sqrt{\max(H\_R_{LL_3}(i,j) * K_{3(LL_3)})} + \epsilon\} \qquad (10)$$

which is a maximum weight factor of embedding with strength S which is function of H_$R_{LL_3}(i,j)$; H_$R_{LL_3}(i,j)$ is the autocorrelation of the pixel (i,j) of the wavelet transformed host image sub-band H_$LL_3$; abs(x) is absolute value of x; $\epsilon$ is a constant generally equal to 5; the value of $K_{3(LL_3)}$ is given by:

$$K_3 = [K_{3(LL_3)}, K_{3(LH_3)}, K_{3(HL_3)}, K_{3(HH_3)}]^T = [20,10,10,10]^T; \qquad (11)$$

Partially watermarked wavelet domain image 435 is the result.

The watermarking process proceeds to embed sub-bands W_$LH_1$, W_$HL_1$ and W_$HH_1$ of the watermark image into respective sub-bands H_$LH_3$, H_$HL_3$ and H_$HH_3$ of the host image. Following these watermarking steps results in watermarked wavelet domain image 440. Performing an inverse Discrete Wavelet Transform (IDWT) on watermarked wavelet domain image 440 results in watermarked image 450.

Figure 7:
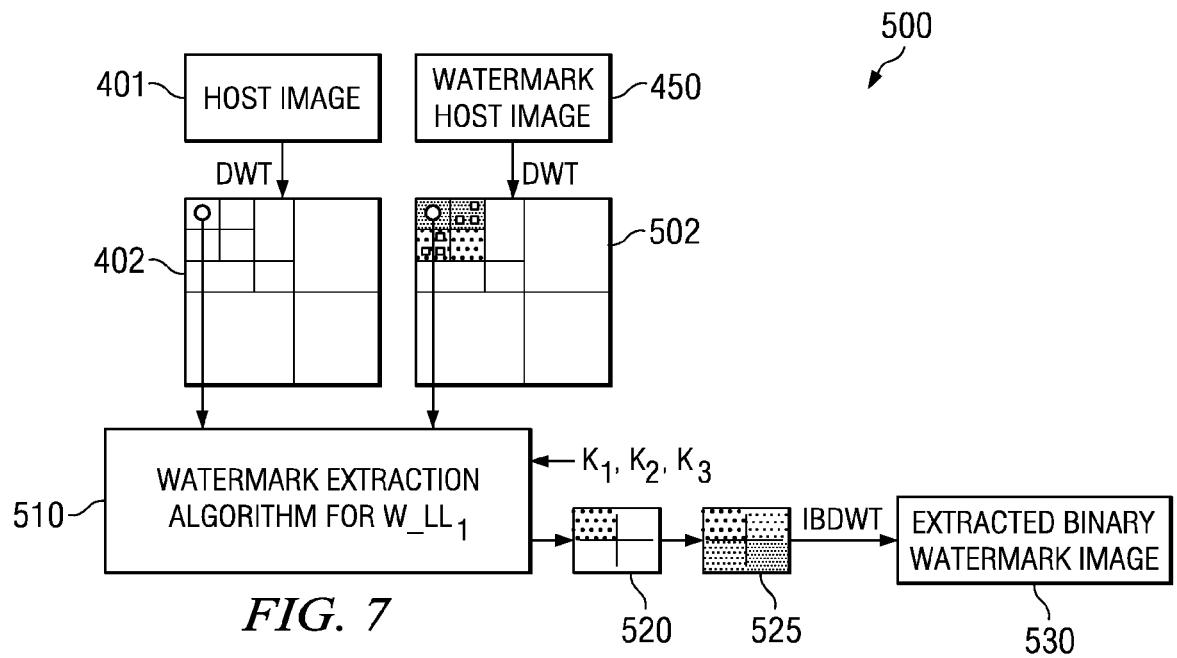
FIG. 7 schematically illustrates extracting the watermark from the watermarked host image.
Figure 8A:
FIG. 8A is an example 256 by 256 gray scale host image and FIG. 8B is an example 64 by 64 binary watermark image.
Figure 8B:
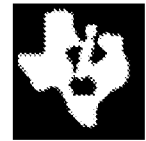

FIG. 7 illustrates process 500 extracting the watermark from watermarked host image 450. Original host image 401 is possibly damaged due to attack 102 illustrated in FIG. 1. Process 500 begins with a discrete wavelet transform (DWT) of original host image 401 yielding wavelet transformed host image 402. This example uses a Daubechies discrete wavelet transform into three level wavelet sub-bands $LL_3$, $LH_3$, $HL_3$, $HH_3$, $LH_2$, $HL_2$, $HH_1$, $LH_1$, $HL_1$ and $HH_1$ such as illustrated in FIG. 5. Process 500 also discrete wavelet transforms (DWT) the watermarked host image 450 yielding wavelet transformed watermarked host image 502. This example also uses a Daubechies discrete wavelet transform into three level wavelet sub-bands $LL_3$, $LH_3$, $HL_3$, $HH_3$, $LH_2$, $HL_2$, $HH_1$, $LH_1$, $HL_1$ and $HH_1$ such as illustrated in FIG. 5.

FIG. 7 illustrates details of process 500 of watermark extraction operating on the H_LL$_3$ sub-band of wavelet transformed host image 502 and the Ĥ_LL$_3$ sub-band of wavelet transformed watermarked host image 502 yielding the Ŵ_LL$_1$, sub-band of the extracted watermark image. The extraction of other sub-bands of the watermark image is similar.

Process 510 calculates the weight factor Ŝ from the wavelet transformed watermarked host image 502 and key $K_{3(LL_3)}$. This calculation is as follows:

$$\hat{S}(\hat{H}\_R_{LL_3}(i,j)) = (2* \sqrt{K_{3(LL_3)}*abs(\hat{H}\_R_{LL_3}(i,j))} + \hat{G}_{LL_3}(i,j), \quad (12)$$

where:

$$\hat{G}_{LL_3}(i,j) = \{2*\sqrt{max(\hat{H}\_R_{LL_3}(i,j)*K_{3(LL_3)})} + \epsilon\} \quad (13)$$

Ĥ_R$_{LL_3}$(i,j) is the autocorrelation of the pixel(i,j) of the wavelet transformed host image sub-band Ĥ_LL$_3$.

Process 510 then models the effect of the attacks on the watermarked host image and decides threshold values in the extraction as follows:

$$\Delta\hat{H}\_R_{LL_s}(i,j) = \hat{H}\_R_{LL_s}(i,j) * H\_R_{LL_s}(i,j) \quad (14)$$

Process 510 performs the inverse of equation (7) to obtain $\tilde{W}\_LL_3(f_{LL_3}(i),j)$. This process uses the following thresholds:

$T_1 = 0.75$ and $T_2 = 1.25$ $$M_{LL_3}(i,j) = (T_1 + 0.75 * \Delta\hat{H}\_R_{LL_3}(i,j))/2$$

$$N_{LL_3}(i,j) = (5*T_2 + 0.75 * \Delta\hat{H}\_R_{LL_3}(i,j))/2; \text{ and} \quad (15)$$

$$R_{LL_3}(i,j) = (T_1 - 0.75 * \Delta\hat{H}\_R_{LL_3}(i,j))/2$$

calculates an intermediate value $D_{LL_3}$ as follows:

$$D_{LL_3} = \frac{abs(\hat{H}\_LL_3(i,j) - H\_LL_3(i,j))}{\alpha_{LL_3} * \hat{S}(\hat{H}\_R_{LL_3}(i,j))} \quad (16)$$

Individual pixels (i,j) of the extracted watermark image are determined from $M_{LL_3}(i,j)$, $N_{LL_3}(i,j)$, $R_{LL_3}(i,j)$ and $D_{LL_3}$ as follows:

If $((D_{LL_3} > 0$ AND $M_{LL_3} < D_{LL_3} > N_{LL_3})$ OR $(D_{LL_3} < 0$ AND $R_{LL_3} < D_{LL_3} > N_{LL_3})$

Then $\hat{W}\_LL_1(f_{LL_3}(i),j) = 1$ (17)

Else $\hat{W}\_LL_1(f_{LL_3}(i),j) = 0$

Process 510 recovers masking function $f$ using key $K_1$ as follows:

$$f_{LL_3}^{-1} : \tilde{W}\_LL_1(f_{LL_3}(i),j) \rightarrow \tilde{W}\_LL_1(i,j) \quad (18)$$

Lastly, process 510 undoes the pseudo randomization of the rows of the watermark image using key $K_2$ as follows:

$$P_{LL_3}^{-1} : \tilde{W}\_LL_1(i,j) \rightarrow W\_LL_1(i,j) \quad (19)$$

The result is wavelet domain partially extracted watermark 520.

Process 510 repeats these steps to extract the sub-bands W_LH$_1$, W_HL$_1$ and W_HH$_1$. These sub-bands combined form wavelet domain extracted watermark 525. This is subjected to an inverse binary discrete wavelet transform to produce extracted watermark image 530.

FIGS. 7 to 12 illustrate an example host image and watermark. FIG. 8A is a 256 by 256 gray scale image entitled "Lena." This particular image is widely used in image experiments. FIG. 8B is 64 by 64 binary watermark image of the logo of Texas Instruments Incorporated, the assignee of this invention. FIG. 9 illustrates the corresponding watermarked image in accordance with this invention just described. The perceptual signal to noise ratio (PSNR) of the watermarked host image as illustrated in FIG. 9 calculated as described in Hsu, C. T. and J. L. Wu, "Multiresolution Watermarking for Digital Images," IEEE Tr. CAS-2, Vol. 45, No. 8, August 1998, pp. 1097-1101 is 38.6039 dB. Perceptually the watermarked host image of FIG. 9 is without many visual artifacts and there is little deterioration from the original host image.

Table 1 shows the extracted watermark performance evaluated on a NC scale for various JPEG attacks. The extracted NC performance is shown for various levels of JPEG compression ratio (CR) and quality factor (QF).

TABLE 1

| JPEG CR | JPEG QF | Extracted Watermark NC |
|---------|---------|------------------------|
| 2.15    | 100     | 0.9034                 |
| 6.70    | 80      | 0.9020                 |
| 9.53    | 60      | 0.8813                 |
| 12.05   | 40      | 0.8551                 |
| 17.11   | 20      | 0.6519                 |
| 20.90   | 10      | 0.5493                 |

FIG. 10 illustrates a comparison of the original watermark image (FIG. 10A) with watermark images extracted from JPEG attacked watermarked host images of qualify factor (QF) 60 in FIG. 10B, 40 in FIG. 10C and 20 in FIG. 10D.

Table 2 shows extracted watermark performance evaluated on a NC scale for various levels of median filtering attacks.

TABLE 2

| Filter Length | Extracted Watermark NC |
|---------------|------------------------|
| 3             | 0.67                   |
| 5             | 0.5191                 |
| 7             | 0.5453                 |
| 9             | 0.5392                 |

FIG. 11 illustrates an extracted watermark resulting from a median filtering attack of length 3.

Table 3 shows extracted watermark performance evaluated on a NC scale for various rotation angles of attack.

TABLE 3

| Rotation Angle (Degrees) | Extracted Watermark NC |
|--------------------------|------------------------|
| 0.25                     | 0.5513                 |
| 0.50                     | 0.5171                 |
| −0.25                    | 0.5815                 |
| −0.50                    | 0.5272                 |

Figure 12A:
FIGS. 12A and 12B illustrate the example host image and the corresponding extracted watermark image subject to for a blurred image attack.
Figure 12B:
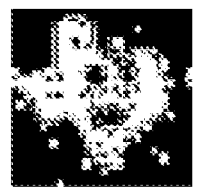

FIG. 12 illustrates the example host image (FIG. 12A) and the corresponding extracted watermark image (FIG. 12B) for a blurred image attack.

Figure 13A:
FIGS. 13A and 13B illustrate the example host image and the corresponding extracted watermark image subject a contrast enhanced host image attack.
Figure 13B:
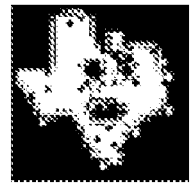

FIG. 13 illustrates the example host image (FIG. 13A) and the corresponding extracted watermark image (FIG. 13B) for a contrast enhanced host image attack.

This invention uses sequency and the wavelet transforms in a novel image watermarking algorithm. The performance results shown in FIGS. 8 to 13 demonstrate superior results over the technique described in Hsu, C. T. and J. L. Wu, "Multiresolution Watermarking for Digital Images," IEEE Tr. CAS-2, Vol. 45, No. 8, August 1998, pp. 1097-1101. This invention is the first attempt to embed a watermark is in the LL band of a wavelet transformed host image. In this invention the PSNR and the perceptual quality of the watermarked host image maintains a good value. In the watermark extraction algorithm of this invention, the impact of the attacks on the statistics of the watermarked image can be taken into account. This invention always demonstrates better results than the existing algorithms on the basis of NC as the extracted watermark quality.

What is claimed is:

1. A method for embedding a binary watermark image into a gray scale host image comprising the steps of:

discrete wavelet transforming the host image;

discrete binary wavelet transforming the watermark image;

for each sub-band subb selected from the set of LL, LH, HL and HH of a first predetermined transform level of the host image and a second predetermined transform level to the watermark image thresholding and binarizing data elements of the corresponding sub-band of the discrete wavelet transformed host image, comparing sequences of thresholded and binarized data elements of the discrete wavelet transformed host image with sequences of the discrete wavelet transformed watermark image to form a watermarking sequency mask, forming watermarked wavelet domain data by combining data elements of the corresponding sub-band of the discrete wavelet transformed host image with data elements of the corresponding sub-band of the wavelet transformed watermark image as filtered by the watermarking mask, and inverse discrete transforming the watermarked wavelet domain data thereby forming a watermarked host image.

2. The method of claim 1, wherein:

said step of comparing sequences generates a sequency key.

3. The method of claim 1, wherein:

said step of comparing sequences to form a watermarking mask includes calculating a binary host image sub-band sequency as follows:

$$S_h = \{S_h(i) \in Z_i; i = 1, \ldots \frac{N}{8}\},$$

calculating a watermark image sub-band sequency as follows:

$$S_w = \{S_w(i) \in Z_i; i = 1, \ldots \frac{N}{8}\},$$

forming said embedding mask $f$ as follows:

$$f_{subb} = \{f(1) = (j: \min|S_h(i) - S_w(j)|)\}$$

$$\forall i \text{ and } j = 1, \ldots, \frac{N}{8} \text{ where } i, j \in \left\{1, \ldots, \frac{N}{8}\right\},$$

where: |X| is the Euclidian norm distance measure, and transforming the watermark image as follows:

$$f_{subb}: W\_subb(i,j) \rightarrow W\_sub(f_{subb}(i),j)$$

where: $W\_subb(i,j)$ is the watermark image; and $W\_subb(f_{subb}(i),j)$ is the transformed watermark image after sequency mask transformation.

4. The method of claim 3, wherein:

said step of comparing sequencies to form a watermarking mask generates a mask key.

5. The method of claim 1, wherein:

said step of forming watermarked wavelet domain data includes combining the host image and the watermarking mask as follows $$\hat{H}\_subb(i,j) = H\_subb(i,j) + \alpha_{subb} * S(H\_R_{subb}(i,j)) * \tilde{W}\_subb(f_{subb}(i),j)$$

where: $H\_subb(i,j)$ is the discrete wavelet transformed host image for the sub-band subb; $\alpha_{subb}$ is a constant watermark strength for the respective sub-band given by:

$$\alpha_{subb} = [\alpha_{LL_3}, \alpha_{LH_3}, \alpha_{HL_3}, \alpha_{HH_3}]^T,$$

$$= [2,1,1,1]^T$$

with $[x]^T$ the transpose of a column vector x;

$$S(H\_R_{subb}(i,j)) = (2 * \sqrt{K_{subb}} * \text{abs}(H\_R_{subb}(i,j)) + G_{subb}(i,j),$$

which is a parabolic function of $H\_R_{subb}(i,j)$; abs(x) is the absolute value of x;

$$G_{subb}(i,j) = \{2 * \sqrt{\max(H\_R_{subb}(i,j) * K_{3sub}} + \epsilon\}$$

which is a maximum weight factor of embedding with strength S which is function of $H\_R_{subb}(i,j)$; $H\_R_{subb}(i,j)$ is the autocorrelation of the pixel(i,j) of the wavelet transformed host image sub-band H_subb; abs (x) is absolute value of x; $\epsilon$ is a predetermined constant; $K_3$ is given by:

$$K_3 = [K_{3(LL)}, K_{3(LH)}, K_{3(HL)}, K_{3(HH)}]^T = [20, 10, 10, 10]^T.$$

6. The method of claim 5, wherein:

$\epsilon$ is equal to 5.

7. The method of claim 1, further comprising:

pseudo randomizing rows of said discrete wavelet transformed watermark image before comparing said sequencies.

8. The method of claim 7, wherein:

said step of pseudo randomizing rows of said discrete wavelet transformed watermark image generates a pseudo randomization key.

9. The method of claim 1, further comprising:

extracting said watermark from a watermarked host image including discrete wavelet transforming said watermarked image, for each sub-band subb selected from the set including LL, LH, HL and HH of said first predetermined transform level of the watermarked host image calculating a weight factor Ŝ as follows:

$$\hat{S}(\hat{H}\_R_{subb}(i,j)) = (2* \overline{\sqrt{K_{subb}*abs(\hat{H}\_R_{subb}(i,j))}} + \hat{G}_{subb}(i,j),$$

where:

$$\hat{G}_{subb}(i,j) = \{2*\sqrt{\max(\hat{H}\_R_{subb}(i,j)*K_{sub}} + \epsilon\};$$

$\hat{H}\_R_{subb}(i,j)$ is the autocorrelation of the pixel(i,j) of the wavelet transformed host image sub-band $\hat{H}\_subb$; and $\epsilon$ is a predetermined constant, determining individual pixels (i,j) of an extracted wavelet domain watermark image from $M_{subb}(i,j)$, $N_{subb}(i,j)$, $R_{subb}(i,j)$ and $D_{subb}$ as follows:

If $((D_{subb}>0 \text{ AND } M_{subb}<D_{subb}>N_{subb}) \text{ OR } (D_{subb}<0 \text{ AND } R_{subb}<D_{subb}>N_{subb})$ Then $\hat{W}\_subb(f_{subb}(i),j)=1$ Else $\hat{W}\_subb(f_{subb}(i),j)=0$ where:

$T_1 = 0.75$ and
$T_2 = 1.25$ $M_{sub}(i, j) = (T_1 + 0.75 * \Delta\hat{H}\_R_{sub}(i, j))/2$ $N_{subb}(i, j) = (5 * T_2 + 0.75 * \Delta\hat{H}\_R_{subb}(i, j))/2$ $R_{subb}(i, j) = (T_1 - 0.75 * \Delta\hat{H}\_R_{subb}(i, j))/2;$ and $$D_{subb} = \frac{abs(\hat{H}\_subb(i, j) - H\_subb(i, j))}{\alpha_{subb} * \hat{S}(\hat{H}\_R_{subb}(i, j))}, \text{ and}$$

inverse discrete binary wavelet transforming the extracted wavelet domain watermark image thereby forming an extracted watermark image.

10. The method of claim 9, further comprising:
modeling the effect of attacks on the watermarked host image and deciding threshold values in the extraction as follows:

$$\Delta\hat{H}\_R_{subb}(i,j) = \hat{H}\_R_{subb}(i,j)*H\_R_{subb}(i,j)$$

where: $H\_R_{subb}(i,j)$ is the autocorrelation of the pixel(i,j) of the wavelet transformed host image sub-band $H\_subb$.

11. The method of claim 9, wherein:
$\epsilon$ is equal to 5.

12. The method of claim 9, further comprising:
pseudo randomizing rows of said discrete wavelet transformed watermark image before comparing said sequences and generating a pseudo randomization key; and said step of extracting said watermark from a watermarked host image includes reverse pseudo randomizing rows of the extracted wavelet domain watermark image using said pseudo randomization key before inverse discrete wavelet transforming the extracted wavelet domain watermark image.

13. The method of extracting a watermark from a watermarked host image comprising the steps of:
discrete wavelet transforming said watermarked image,
for each sub-band subb selected from the set including LL, LH, HL and HH of said first predetermined transform level of the watermarked host image calculating a weight factor Ŝ as follows:

$$\hat{S}(\hat{H}\_R_{subb}(i,j)) = (2* \overline{\sqrt{K_{subb}*abs(\hat{H}\_R_{subb}(i,j))}} + \hat{G}_{subb}(i,j),$$

where:

$$\hat{G}_{subb}(i,j) = \{2*\sqrt{\max(\hat{H}\_R_{subb}(i,j)*K_{sub}} + \epsilon\};$$

$\hat{H}\_R_{subb}(i,j)$ is the autocorrelation of the pixel(i,j) of the wavelet transformed host image sub-band $\hat{H}\_subb$; and $\epsilon$ is a predetermined constant, determining individual pixels (i,j) of an extracted wavelet domain watermark image from $M_{subb}(i,j)$, $N_{sub}(i,j)$, $R_{sub}(i,j)$ and $D_{subb}$ as follows:

If $((D_{subb}>0 \text{ AND } M_{subb}<D_{subb}>N_{subb}) \text{ OR } (D_{subb}<0 \text{ AND } R_{subb}<D_{subb}>N_{subb})$ Then $\hat{W}\_subb(f_{subb}(i),j)=1$ Else $\hat{W}\_subb(f_{subb}(i),j)=0$ where:

$T_1 = 0.75$ and
$T_2 = 1.25$ $M_{sub}(i, j) = (T_1 + 0.75 * \Delta\hat{H}\_R_{sub}(i, j))/2$ $N_{subb}(i, j) = (5 * T_2 + 0.75 * \Delta\hat{H}\_R_{subb}(i, j))/2$ $R_{subb}(i, j) = (T_1 - 0.75 * \Delta\hat{H}\_R_{subb}(i, j))/2;$ and $$D_{subb} = \frac{abs(\hat{H}\_subb(i, j) - H\_subb(i, j))}{\alpha_{subb} * \hat{S}(\hat{H}\_R_{subb}(i, j))}, \text{ and}$$

inverse discrete binary wavelet transforming the extracted wavelet domain watermark image thereby forming an extracted watermark image.

14. The method of claim 13, further comprising:
modeling the effect of attacks on the watermarked host image and deciding threshold values in the extraction as follows:

$$\Delta\hat{H}\_R_{subb}(i,j) = \hat{H}\_R_{subb}(i,j)*H\_R_{subb}(i,j)$$

where: $H\_R_{subb}(i,j)$ is the autocorrelation of the pixel(i,j) of the wavelet transformed host image sub-band $H\_subb$.

15. The method of claim 13, wherein:
$\epsilon$ is equal to 5.

16. The method of claim 13, further comprising:
reverse pseudo randomizing rows of the extracted wavelet domain watermark image using a pseudo randomization key before inverse discrete binary wavelet transforming the extracted wavelet domain watermark image.

* * * * *